(12) United States Patent
Chen

(10) Patent No.: US 6,988,521 B2
(45) Date of Patent: Jan. 24, 2006

(54) NON-INFLATABLE TIRE AND MANUFACTURE METHOD THEREOF

(75) Inventor: Shun-Min Chen, Taipei Hsien (TW)

(73) Assignee: Kenny Cheng (TW)

( * ) Notice: Subject to any disclaimer, the term of this patent is extended or adjusted under 35 U.S.C. 154(b) by 77 days.

(21) Appl. No.: 10/610,255

(22) Filed: Jun. 30, 2003

(65) Prior Publication Data

US 2004/0261925 A1 Dec. 30, 2004

(51) Int. Cl.
B60C 7/12 (2006.01)

(52) U.S. Cl. .............. 152/310; 152/323; 152/393; 264/45.5

(58) Field of Classification Search ............. 152/310, 152/311, 5, 7, 323, 324, 325, 326, 318, 393, 152/342.1, 429, 46.4, 427, 428, 430, 431; 264/46.9, 45.7, 45.5, 328.1, 230, 46.4; 425/49, 425/54

See application file for complete search history.

(56) References Cited

U.S. PATENT DOCUMENTS

| | | | | |
|---|---|---|---|---|
| 3,095,917 A | * | 7/1963 | Arsandaux | 152/155 |
| 4,588,542 A | * | 5/1986 | Pierce | 264/45.5 |
| 4,722,377 A | * | 2/1988 | Dobson | 152/158 |
| 4,909,972 A | * | 3/1990 | Britz | 264/51 |
| 6,502,612 B2 | * | 1/2003 | Hsiao | 152/393 |
| 2002/0036040 A1 | | 3/2002 | Chen | |

FOREIGN PATENT DOCUMENTS

| | | |
|---|---|---|
| WO | WO 99/55541 | 11/1999 |
| WO | WO 9955541 A1 * | 11/1999 |

* cited by examiner

*Primary Examiner*—Frantz F. Jules
(74) *Attorney, Agent, or Firm*—Gauthier & Connors LLP

(57) ABSTRACT

A non-inflatable tire comprises a rim, an inner tire layer made of foamed material, and an outer tire layer formed by rotational molding or injection molding to encircle the rim and having at least an injection orifice at a side surface thereof for injecting material of the inner tire layer, wherein the material of the inner tire layer is injected into and foamed in the outer tire layer to form the inner tire layer such that the outer tire layer, the inner tire layer, and the rim are tightly connected with one another. A manufacture method of the non-inflatable tire comprises the steps: producing a rim, inserting the rim into a die and forming an outer tire layer having at least an injection orifice at a side surface thereof for injecting material of an inner tire layer by rotational molding or injection molding, injecting the material of the inner tire layer through the injection orifice of the outer tire layer, and foaming the material of the inner tire layer to make the outer tire layer, the inner tire layer, and the rim be tightly connected with one another.

12 Claims, 4 Drawing Sheets

NON-INFLATABLE TIRE AND MANUFACTURE METHOD THEREOF

FIELD OF THE INVENTION

The present invention relates generally to a non-inflatable tire and manufacture method thereof, and more particularly to a non-inflatable tire comprising a rim, an inner tire layer, and an outer tire layer and manufacture method thereof.

BACKGROUND OF THE INVENTION

With advancement of the society and the promotion of life quality, variable designs occur to strollers and children toys. Traditional inflatable tires have an outer tire layer made of rubber and a hollow inner tire layer. These traditional inflatable tires must be filled with air into inner tire layer when used, which makes the inflatable tires have the risk of implosion or become an annoyance due to having to inflate the tires from time to time.

In view of the above deficiencies of inflatable tires, a non-inflatable tire is developed. However, the entire traditional non-inflatable tire itself is constructed by foamed material such as EVA with foaming agent. Because the traditional non-inflatable tire is thoroughly manufactured by foam molding, the tread patterns formed on the tire fail to be of a taper near vertical angle corresponding to the die relief. Moreover, the properties of the EVA itself are different from those of the rubber, so that the characteristics of the traditional non-inflatable tire, such as wear resistance and resiliency, are worse.

An improved tire for the above non-inflatable tire is disclosed in U.S. Pat. No. 2002/0036040A1 where the tire has an outer tire layer 10, an inner tire layer 20, and a rim 30 as the exploded perspective view shown in FIG. 1. The inner tire layer 20 is made of foamed material and the outer tire layer 10 is made of rubber to form an annular hollow interior. The manufacture processes include first, respectively producing the outer tire layer 10, inner tire layer 20, and rim 30, next, mounting the inner tire layer 20 around the rim 30, and finally, assembling the outer tire layer 10 around the outer periphery of the inner tire layer 20. It is the advantage of this type of traditional non-inflatable tire that the tire is more resilient due to the inner tire layer being made of foamed material and the special tread patterns are easily formed on the outer tire layer to upgrade wear resistance of the tire due to the outer tire layer being made of rubber. However, because this kind of non-inflatable tire must be mechanically assembled through two steps, the reliability of connection among the outer tire layer 10, inner tire layer 20, and rim 30 is low, which results in the outer tire layer 10 or inner tire layer 20 having tendency of being escaped from the rim 30 and causes safety concerns when the tire is used in addition to shorter lifespan.

SUMMARY OF THE INVENTION

In view of the above-mentioned problems of prior arts, the present invention provides a non-inflatable tire and manufacture method thereof. The tire is not only of greater resiliency but also of better wear resistance. Besides, the outer tire layer, inner tire layer, and rim are tightly connected with each other so that it is difficult for the outer tire layer and inner tire layer to be escaped from the rim.

Additional features and advantages of the invention will be set forth in the description which follows, and in part will be apparent from the description, or may be learned by practice of the invention. The objectives and advantages of the invention will be realized and attained by the structures and steps particularly pointed out in the written description and claims hereof as well as the appended drawings.

To achieve these and other advantages and according to the purpose of the present invention, as embodied and broadly described, a manufacture method of a non-inflatable tire comprises the following steps: producing a rim, inserting the rim into a die and forming an outer tire layer having at least an injection orifice at a side surface thereof for injecting material of an inner tire layer by rotational molding, injecting material of the inner tire layer through the injection orifice of the outer tire layer, and foaming the material of the inner tire layer to make the outer tire layer, the inner tire layer, and the rim be tightly connected with one another.

It is preferred that a manufacture method of a non-inflatable tire, comprising the following steps: producing a rim, inserting the rim into a die and forming an outer tire layer having at least an injection orifice at a side surface thereof for injecting material of an inner tire layer by injection molding, injecting material of the inner tire layer through the injection orifice of the outer tire layer, and foaming the material of the inner tire layer to make the outer tire layer, the inner tire layer, and the rim be tightly connected with one another.

A non-inflatable tire comprises a rim, an outer tire layer formed by rotational molding to encircle the rim and having at least an injection orifice at a side surface thereof for injecting material of an inner tire layer; and an inner tire layer made of foamed material, wherein the material of the inner tire layer is injected into the outer tire layer through the injection orifice of the outer tire layer and then the material of the inner tire layer is foamed to form the inner tire layer such that the outer tire layer, the inner tire layer, and the rim are tightly connected with one another.

It is preferred that a non-inflatable tire comprises a rim, an outer tire layer formed by injection molding to encircle the rim and having at least an injection orifice at a side surface thereof for injecting material of an inner tire layer; and an inner tire layer made of foamed material, wherein the material of the inner tire layer is injected into the outer tire layer through the injection orifice of the outer tire layer and then the material of the inner tire layer is foamed to form the inner tire layer such that the outer tire layer, the inner tire layer, and the rim are tightly connected with one another.

Alternatively, the material of the rim is metal or plastics.

Advantageously, the material of the outer tire layer is rubber, TPE, TPR, or PVC.

Advantageously, the material of the inner tire layer is EVA or PU added with foaming agent.

It should be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

The elements of the present invention similar to those of the prior art are named the same but numbered different.

Figure 1:
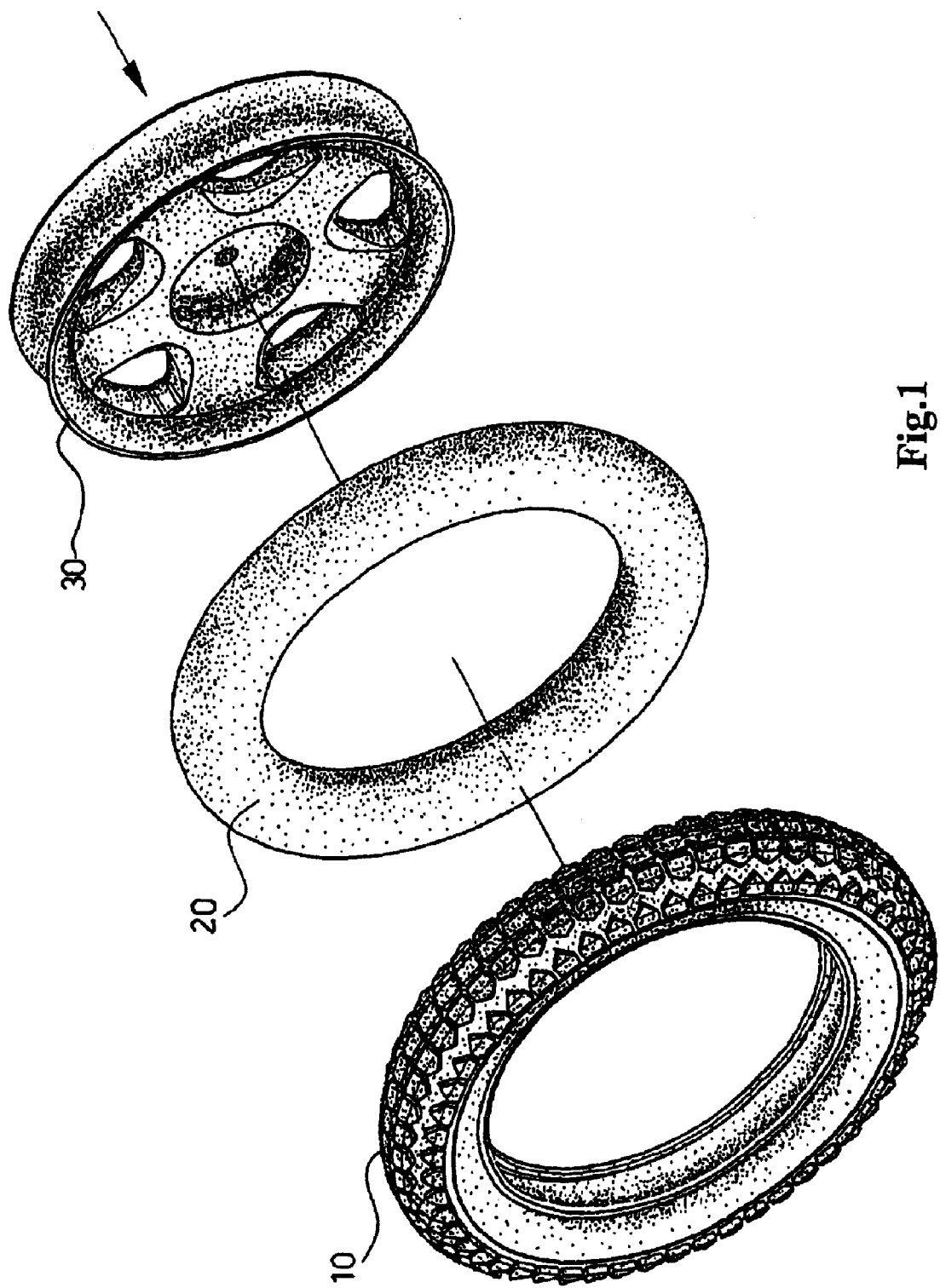
FIG. 1 is an exploded perspective view illustrating a traditional non-inflatable tire.
Figure 2:
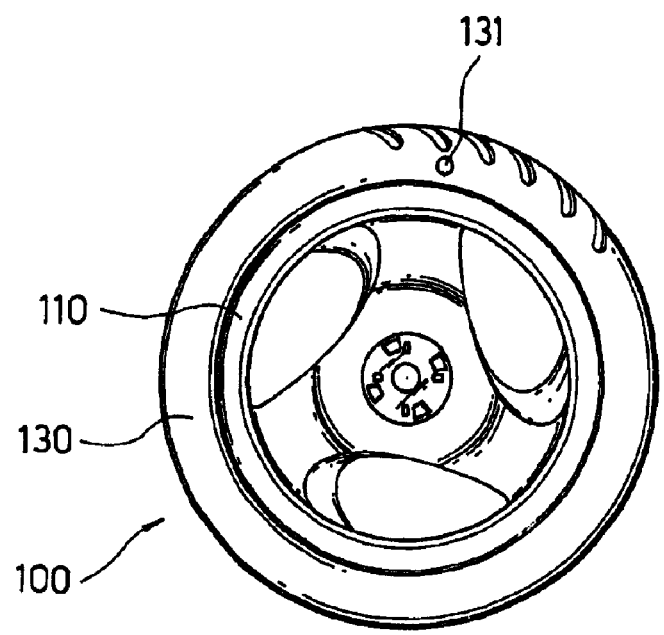
FIG. 2 is a front view of the non-inflatable tire according to the present invention.
Figure 3:
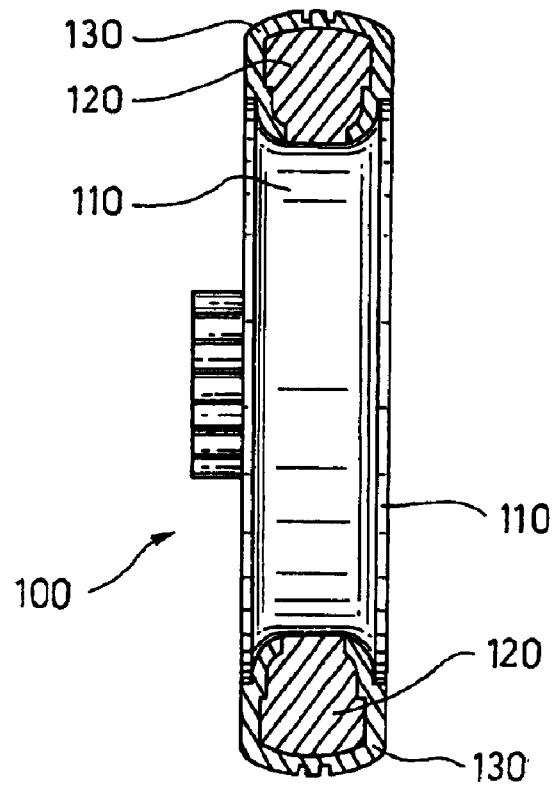
FIG. 3 is a sectional view of the non-inflatable tire according to FIG. 2.

With reference to FIG. 2 and 3, the front view and sectional view of the non-inflatable tire 100 according to the present invention are respectively illustrated. As shown in FIG. 3, the non-inflatable tire 100 according to the present invention comprises a rim 110, an inner tire layer 120, and an outer tire layer130. As shown in FIG. 2, the outer tire layer 130 has at least an injection orifice 131 at the side surface thereof for injecting material to form the inner tire layer 120. The number of injection orifice can be changed dependent on the material of the inner tire layer 120. When the number of injection orifices is plural, they are evenly distributed at the side surface of the outer tire layer 130.

The rim 110 is made of harder material such as metal or harder plastic material. The outer tire layer 130 has tread on outer surface thereof and can be made of wear-resistant rubber, TPE, TPR, or PVC etc. The inner tire layer 120 is made of foamed material such as EVA or PU added with foaming agent.

Figure 5:
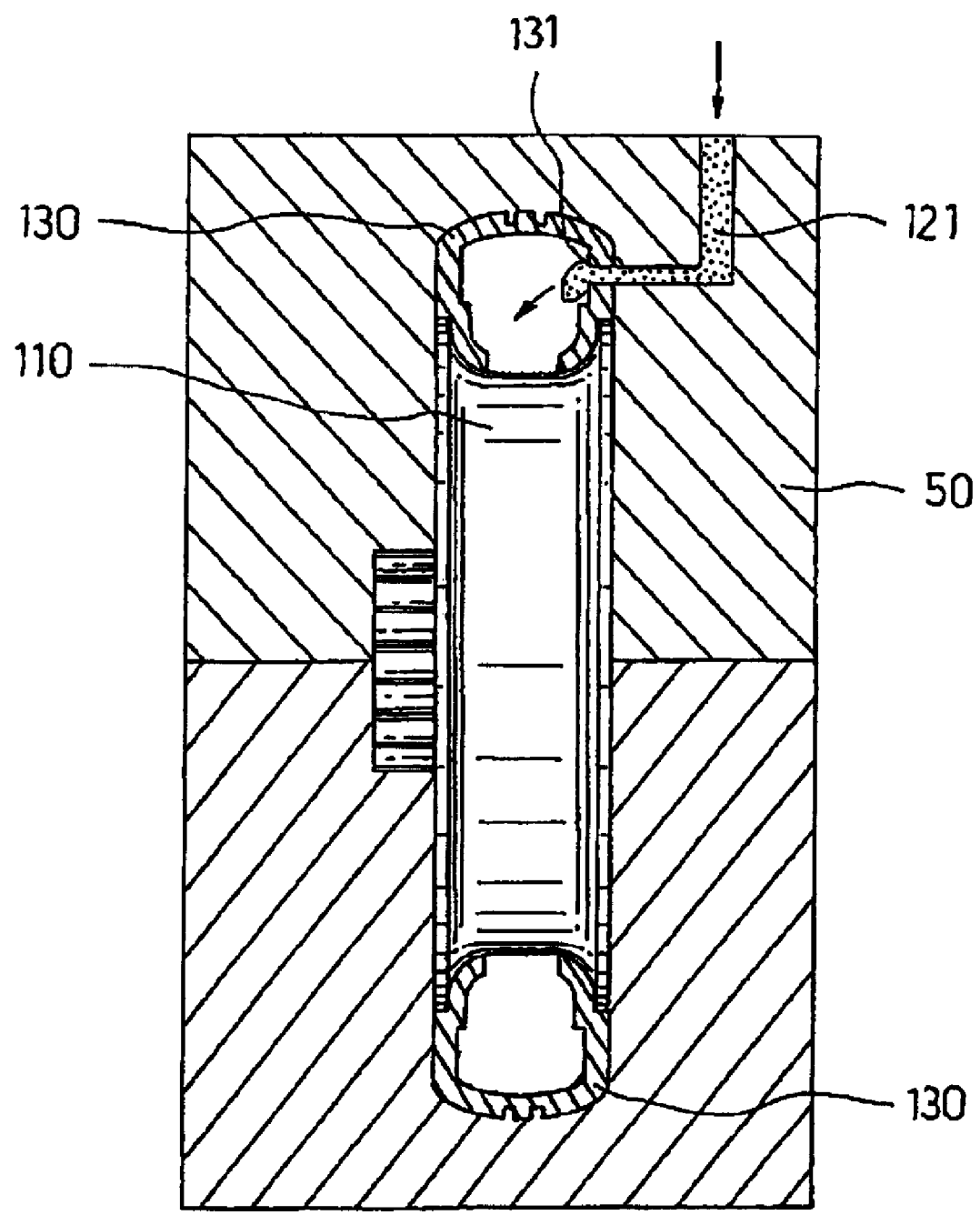
FIG. 5 is a sectional view of the non-inflatable tire in a die according to the present invention, illustrating injecting material of the inner tire into the outer tire layer.

The steps include at first, producing a rim 110, next, inserting the rim 110 into a die 50 as shown in FIG. 5, then forming an outer tire layer to encircle the rim 110 by rotational molding or injection molding. The outer tire layer 130 has at least one injection orifice 131 at side surface thereof for injecting material 121 into the outer tire layer 130 to foam and form the inner tire layer 120 between the outer tire layer 130 and rim 110, which constructs the non-inflatable tire 100 according to the present invention.

As shown in FIG. 3, because the outer tire layer 130 has a non-closed section with an annular opening formed on the inner periphery, the outer tire layer 130, inner tire layer 120, and rim 110 are firmly and integrally connected with each other after the material 121 of the inner tire layer 120 is foamed.

Figure 4:
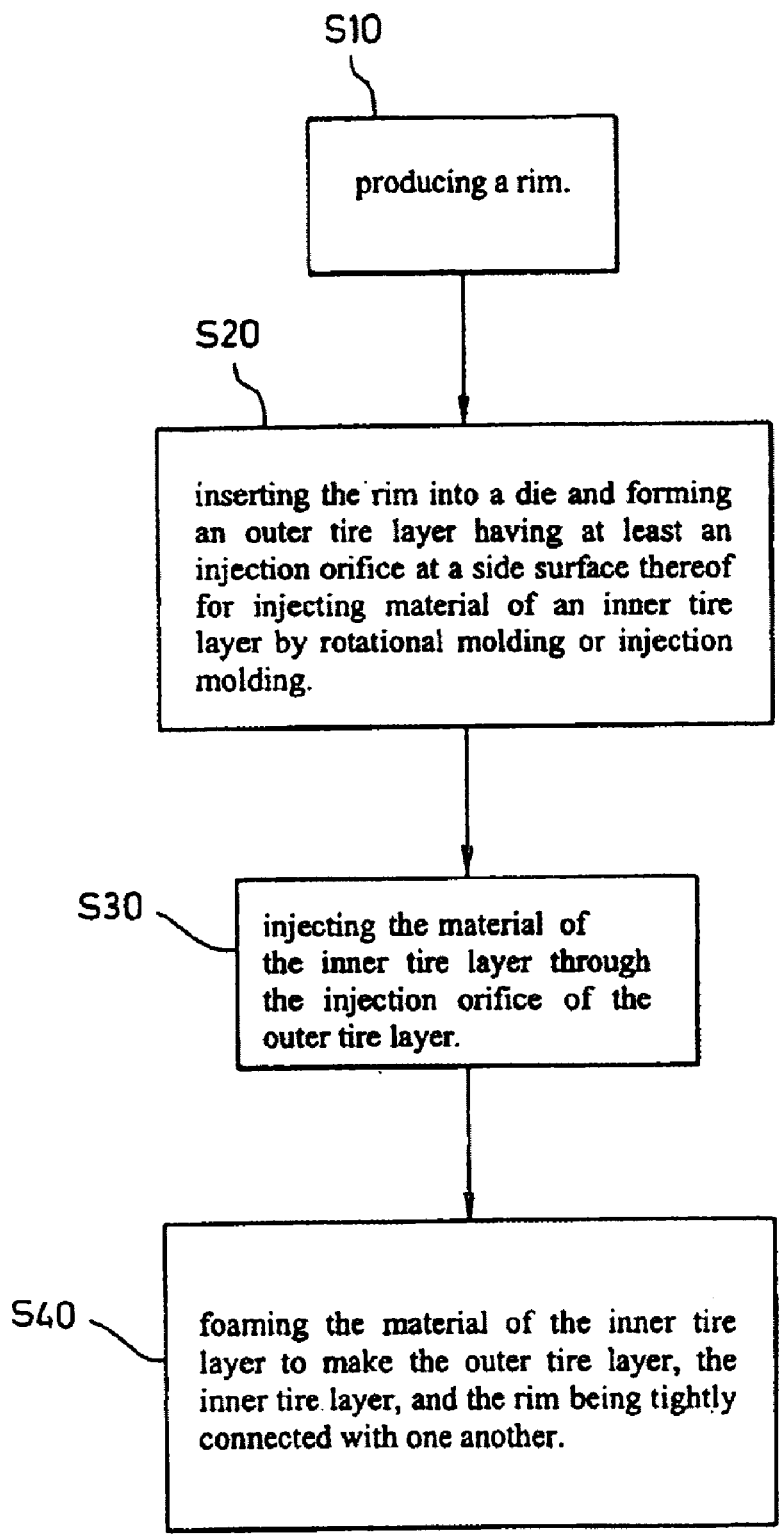
FIG. 4 is a flow chart of the manufacture method of non-inflatable tire according to the present invention.

The manufacture method of the non-inflatable tire according to the present invention will be described hereinafter and the flow chart thereof is shown in FIG. 4 which includes the following steps : step S10, producing a rim 110, step S20, inserting the rim 110 into a die 50 and then forming an outer tire layer having at least one injection orifice 131 at side surface thereof for injecting material 121 of the inner tire layer 120 by rotational molding or injection molding, step 530, injecting material 121 of the inner tire layer 120 through injection orifice 131 of the outer tire layer 130, and step 540, foaming the material 121 of the inner tire layer 120 to make the outer tire layer 130, inner tire layer 120, and rim 110 be firmly and integrally connected with one another.

The non-inflatable tire 100 manufactured by the method of the present invention is of the advantages of greater resiliency and better wear resistance. Besides, because the mechanical assemblies among the outer tire layer 130, inner tire layer 120, and rim 110 are not necessary, not only can the non-inflatable tires 100 be mass-produced but also the connections among the components of the non-inflatable tire 100 are integrated and firm so as to upgrade safety and lifespan of the tire.

This invention has been disclosed in terms of specific embodiments. It will be apparent that many modifications can be made to the disclosed structures and steps without departing from the invention. Therefore, it is the intent of the appended claims to cover all such variations and modifications as come within the true sprit and scope of this invention.

What is claimed is:

1. A method of manufacturing a non-inflatable tire, comprising the following steps:

producing a rim;

inserting the rim into a die and forming an outer tire layer having at least an injection orifice at a side surface thereof for injecting material of an inner tire layer by rotational molding;

injecting the material of the inner tire layer through the injection orifice of the outer tire layer; and foaming the material of the inner tire layer to make the outer tire layer, the inner tire layer, and the rim be tightly connected with one another.

2. A method of manufacturing a non-inflatable tire, comprising the following steps:

producing a rim;

inserting the rim into a die and forming an outer tire layer having at least an injection orifice at a side surface thereof for injecting material of an inner tire layer by injection molding;

injecting the material of the inner tire layer through the injection orifice of the outer tire layer; and foaming the material of the inner tire layer to make the outer tire layer, the inner tire layer, and the rim be tightly connected with one another.

3. A method of manufacturing the non-inflatable tire as claimed in claim 1 or 2, wherein the material of the rim is metal.

4. A method of manufacturing the non-inflatable tire as claimed in claim 1 or 2, wherein the material of the rim is plastics.

5. A method of manufacturing the non-inflatable tire as claimed in claim 1 or 2, wherein the material of the outer tire layer is rubber, TPE, TPR, or PVC.

6. The manufacture method of the non-inflatable tire as claimed in claim 1 or 2, wherein the material of the inner tire layer is EVA or PU added with foaming agent.

7. A non-inflatable tire, comprising:

a rim;

an inner tire layer made of foamed material;

an outer tire layer formed by rotational molding to encircle the rim, having at least an injection orifice at a side surface thereof for injecting material of the an inner tire layer; and wherein the material of the inner tire layer is injected into the outer tire layer through the injection orifice of the outer tire layer and then the material of the inner tire layer is foamed to form the inner tire layer such that the outer tire layer, the inner tire layer, and the rim are tightly connected with one another.

8. A non-inflatable tire, comprising a rim;

an inner tire layer made of foamed material;

an outer tire layer formed by injection molding to encircle the rim, having at least an injection orifice at a side surface thereof for injecting material of the inner tire layer; and wherein the material of the inner tire layer is injected into the outer tire layer through the injection orifice of the outer tire layer and then the material of the inner tire layer is foamed to form the inner tire layer such that the outer tire layer, the inner tire layer, and the rim are tightly connected with one another.

9. The non-inflatable tire as claimed in claim 7 or 8, wherein the material of the rim is metal.

10. The non-inflatable tire as claimed in claim 7 or 8, wherein the material of the rim is plastics.

11. The non-inflatable tire as claimed in claim 7 or 8, wherein the material of the outer tire layer is rubber, TPE, TPR, or PVC.

12. The non-inflatable tire as claimed in claim 7 or 8, wherein the material of the inner tire layer is EVA or PU added with foaming agent.

* * * * *